United States Patent [19]

Schuchman et al.

[11] Patent Number: 5,422,813
[45] Date of Patent: Jun. 6, 1995

[54] NO-OUTAGE GPS/COMMERCIAL RF POSITIONING SYSTEM

[75] Inventors: Leonard Schuchman; Aaron Weinberg, both of Potomac, Md.; Lloyd Engelbrecht, Reston, Va.

[73] Assignee: Stanford Telecommunications, Inc., Reston, Va.

[21] Appl. No.: 115,087

[22] Filed: Sep. 2, 1993

Related U.S. Application Data

[63] Continuation-in-part of Ser. No. 992,892, Dec. 17, 1992, Pat. No. 5,365,450, and a continuation-in-part of Ser. No. 79,810, Jun. 22, 1993.

[51] Int. Cl.⁶ .......................... G06G 7/78; G01S 5/02; H04B 7/185
[52] U.S. Cl. ..................... 364/449; 364/444; 364/450; 364/443; 342/357; 342/367; 342/457; 342/358; 342/463; 455/33.2; 455/33.4; 455/56.1
[58] Field of Search ............... 364/443, 444, 449, 450, 364/451, 458, 452, 460, 571.01, 571.02, 571.03, 571.04, 571.05, 571.08; 342/386, 357, 356, 361, 451, 457, 461, 464, 394, 351, 465, 352, 450; 340/825.35, 993, 990, 898, 995, 991; 375/1, 120, 5, 96; 235/375, 385; 455/32.1, 34.2, 33.2, 50.1, 52.3

[56] References Cited

U.S. PATENT DOCUMENTS

| | | | |
|---|---|---|---|
| 3,191,176 | 9/1962 | Guier | 342/357 |
| 3,889,264 | 6/1975 | Fletcher | 342/394 |
| 4,054,880 | 10/1977 | Dalabakis et al. | 342/464 |
| 4,651,156 | 3/1987 | Martinez | 342/457 |
| 4,651,157 | 3/1987 | Gray et al. | 342/457 |
| 4,731,613 | 3/1988 | Endo et al. | 342/357 |
| 4,743,913 | 3/1988 | Takai | 342/457 |
| 4,750,197 | 6/1988 | Denekamp et al. | 379/58 |
| 4,751,512 | 6/1988 | Longaker | 342/357 |
| 4,754,465 | 6/1988 | Trimble | 375/1 |
| 4,785,463 | 11/1988 | Janc et al. | 375/1 |
| 4,791,572 | 12/1988 | Green, III et al. | 364/449 |
| 4,809,005 | 2/1989 | Counselman et al. | 342/352 |
| 4,884,208 | 11/1989 | Marinelli et al. | 364/460 |
| 4,891,650 | 1/1990 | Sheffer | 342/457 |
| 4,891,761 | 1/1990 | Gray et al. | 342/457 |

(List continued on next page.)

FOREIGN PATENT DOCUMENTS 1277400 12/1990 Canada .
2541801 8/1984 France .

OTHER PUBLICATIONS

Terrapin Corporation Paper (13 pages) Jan. 1993.

*Primary Examiner*—Kevin J. Teska
*Assistant Examiner*—Jacques H. Louis-Jacques
*Attorney, Agent, or Firm*—Jim Zegeer

[57] ABSTRACT

The present invention relates to a no outage GPS/AM position finding system wherein a GPS system having a plurality of satellites transmits time and location data over radio frequency signals to enable a mobile GPS receiver station on the ground to determine its position, and a cellular telephone is carried with the mobile GPS receiver, traveling in range of a plurality of conventional ground based amplitude modulated (AM) transmitters for transmitting AM signals. Each mobile GPS receiver station includes phase detection means for simultaneously receiving a predetermined number of the AM signals, and measuring the changes in phase of each of the AM signals as the mobile GPS receiver travels, and deriving therefrom an AM position signal. A reference station for receiving the GPS and AM signals provides correction signals via a cellular telephone network which receives and transmits the correction signals to the mobile GPS receiver station. The last accurate GPS position signal is used for resolving any ambiguities in the AM radio position signal and to accommodate the lack of synchronization in the AM transmitters. The reference station measures the frequency and wavelength variations in the AM signals and conveys same to the mobile GPS receiver station by the cellular telephone. The AM position signal is activated upon detecting outages or blockages in the GPS signals.

7 Claims, 4 Drawing Sheets

U.S. PATENT DOCUMENTS

| | | | |
|---|---|---|---|
| 4,899,285 | 2/1990 | Nakayama et al. | 364/453 |
| 4,903,212 | 2/1990 | Yokouchi et al. | 364/449 |
| 4,912,756 | 3/1990 | Hop | 379/60 |
| 4,953,198 | 8/1990 | Daly et al. | 379/61 |
| 5,003,317 | 3/1991 | Gray et al. | 342/457 |
| 5,014,206 | 5/1991 | Schribner et al. | 364/449 |
| 5,017,926 | 5/1991 | Ames et al. | 342/353 |
| 5,036,329 | 7/1991 | Ando | 342/357 |
| 5,075,693 | 12/1991 | McMillan et al. | 342/457 |
| 5,087,919 | 2/1992 | Odagawa et al. | 342/357 |
| 5,119,504 | 6/1992 | Durborow, III | 455/54.1 |
| 5,144,318 | 9/1992 | Kishi | 342/357 |
| 5,146,231 | 9/1992 | Ghaem et al. | 342/419 |
| 5,148,179 | 9/1992 | Allison | 342/357 |
| 5,148,452 | 9/1992 | Kennedy et al. | 375/96 |
| 5,155,490 | 10/1992 | Spradley, Jr. et al. | 342/358 |
| 5,155,491 | 10/1992 | Ando | 364/449 |
| 5,173,710 | 12/1992 | Kelley et al. | 342/463 |
| 5,177,490 | 1/1993 | Ando et al. | 342/357 |
| 5,179,519 | 1/1993 | Adachi et al. | 364/449 |
| 5,185,610 | 2/1993 | Ward et al. | 342/357 |
| 5,189,430 | 2/1993 | Yano et al. | 342/457 |
| 5,194,871 | 3/1993 | Counselman, III | 342/357 |
| 5,202,829 | 4/1993 | Geir | 364/449 |
| 5,208,756 | 5/1993 | Song | 364/449 |
| 5,214,789 | 5/1993 | George | 455/33.2 |
| 5,218,618 | 6/1993 | Sagey | 342/457 |
| 5,220,509 | 6/1993 | Takemura et al. | 364/449 |
| 5,222,245 | 6/1993 | Ando et al. | 455/13.2 |
| 5,223,844 | 6/1993 | Mansell et al. | 342/357 |
| 5,225,842 | 7/1993 | Brown et al. | 342/357 |
| 5,225,843 | 7/1993 | Thompson | 342/367 |
| 5,225,843 | 7/1993 | Thompson | 342/367 |
| 5,235,633 | 8/1993 | Dennison et al. | 379/60 |
| 5,248,981 | 9/1993 | Yoshihara et al. | 342/357 |
| 5,280,295 | 1/1994 | Kelly et al. | 342/463 |
| 5,323,164 | 6/1994 | Endo | 342/357 |
| 5,343,209 | 8/1994 | Sennott et al. | 342/357 |

AM CARRIER 1 (CARRIER $F_1$; WAVE LENGTH $\lambda_1$)

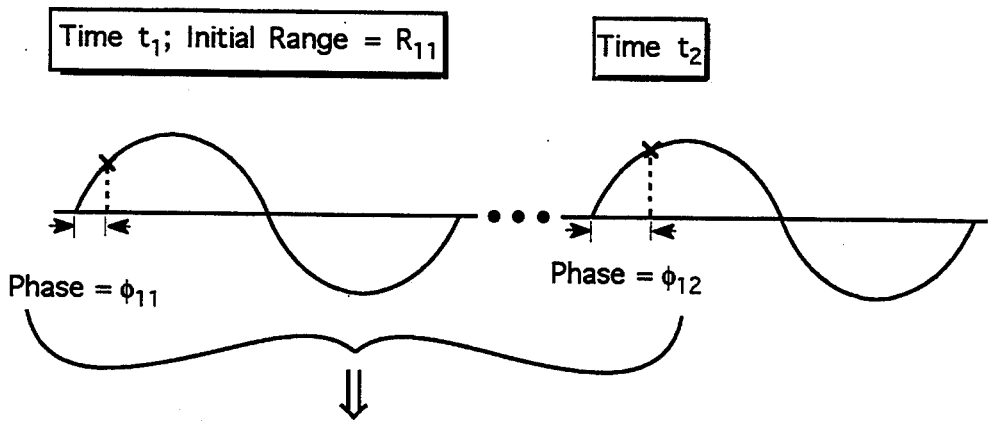

- Incremental Phase = $\phi_{12} - \phi_{11}$ (Radians)
  ⇒ Incremental Range = $\lambda_1[(\phi_{12} - \phi_{11})/2\pi] = \Delta R$
  ⇒ Estimate of New Range at $t_2$, $R_{12} = R_{11} + \Delta R$

- Simultaneous Computations for 3 other AM signals Yield New Range Values:
  $R_{22}$, $R_{32}$, $R_{42}$

- Differenced Ranges Formed: $R_{22} - R_{12}$; $R_{32} - R_{12}$; $R_{42} - R_{12}$
  -Differencing Eliminates Vehicle's Local Clock Error

- Set of Differenced Ranges Processed to Yield Updated Position

- Process Repeats Every 0.5 sec (TBR)

FIG. 3

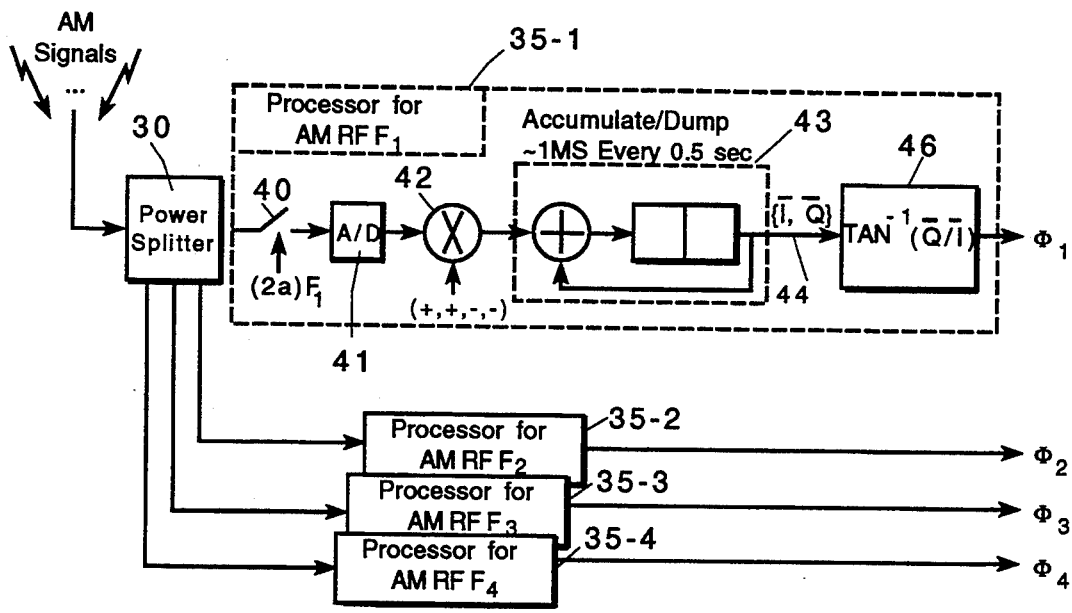

MATHEMATICAL DESCRIPTION

- $a(t)$ Represents AM Information; $w$ is AM Carrier Radian Frequency; (Reflects Reference Station Corrections); $wt_i$ is Odd Multiple of $\pi/2$

- I-Samples: $A[1+a(t_i)] \cos[wt_i + \Phi] \sim A[1+a(t_i)] \cos \Phi$

- Q-Samples: $A[1+a(t_i+\delta)] \sin[wt_i + \Phi] \sim A[1+a(t_i)] \sin \Phi; a(t_i+\delta) \sim a(t_i)$ for $\delta \sim 1\mu s$

- $\bar{I} \sim A \sum_i [1+a(t_i)] \cos \Phi; \bar{Q} \sim A \sum_i [1+a(t_i)] \sin \Phi$ Note: $\Phi$ Varies Negligibly Over Averaging Interval (~ 1 ms)

$$\Rightarrow \boxed{\Phi = \text{TAN}^{-1}(\bar{Q}/\bar{I})}$$

FIG. 4

NO-OUTAGE GPS/COMMERCIAL RF POSITIONING SYSTEM

REFERENCE TO RELATED APPLICATIONS

This application is a continuation-in-part of application Ser. No. 07/992,892, filed Dec. 17, 1992, entitled "HYBRID GPS/DATA LINK UNIT FOR RAPID, PRECISE AND ROBUST POSITION DETERMINATION", now U.S. Pat. No. 5,365,450, and application Ser. No. 08/079,810, filed Jun. 22, 1993, entitled "HYBRID GPS/DATA LINK UNIT WITH VOICE IN DATA MODEM", now pending, which are incorporated herein by reference.

BACKGROUND OF THE INVENTION

This invention relates to automobile traveler services, using a combination of the global positioning system (GPS) and the commercial cellular telephone network and provides the additional system capability to passively monitor local AM radio stations, within urban canyon areas, and use these signals to augment GPS tracking when automobile receipt of GPS signals is impaired by the urban environment. This enhanced system may be termed No-Outage GPS/AM Positioning System and incorporates the following unique features:

1. International system, with no coverage gaps; this reflects the global coverage provided by GPS and the international standardization of the AM radio waveform.
2. Reception and processing of GPS and AM radio signals, without any interaction or coordination with the GPS and AM systems.
3. GPS is the primary positioning system, with AM signals used for augmentation only in urban canyon areas where GPS is least reliable but AM is most reliable.
4. Each urban canyon area of interest contains a low-cost reference station that measures "AM differential corrections" and provides them to the vehicles via the cellular network.
5. Position accuracy ~30m (3σ); this reflects differential GPS and also reflects the accuracy achievable via tone ranging of AM signals (the AM wavelength ranges from ~600' to 2000').
6. Within the urban canyon environment, AM signal propagation reflects a degree of robustness against multipath, relative to higher frequency radio signals (e.g., FM), due to the long wavelength of AM signals.

DESCRIPTION OF THE DRAWINGS

The above and other objects, advantages and features of the invention will become more apparent when considered with the following specification and accompanying drawings wherein:

FIG. 3 is a diagrammatic waveform illustrating the AM positioning process using differential range measurements via tone ranging of the AM carriers, and FIG. 4 is a block diagram illustrating the signal processing in one embodiment of the invention.

DETAILED DESCRIPTION OF THE INVENTION

Figure 1:
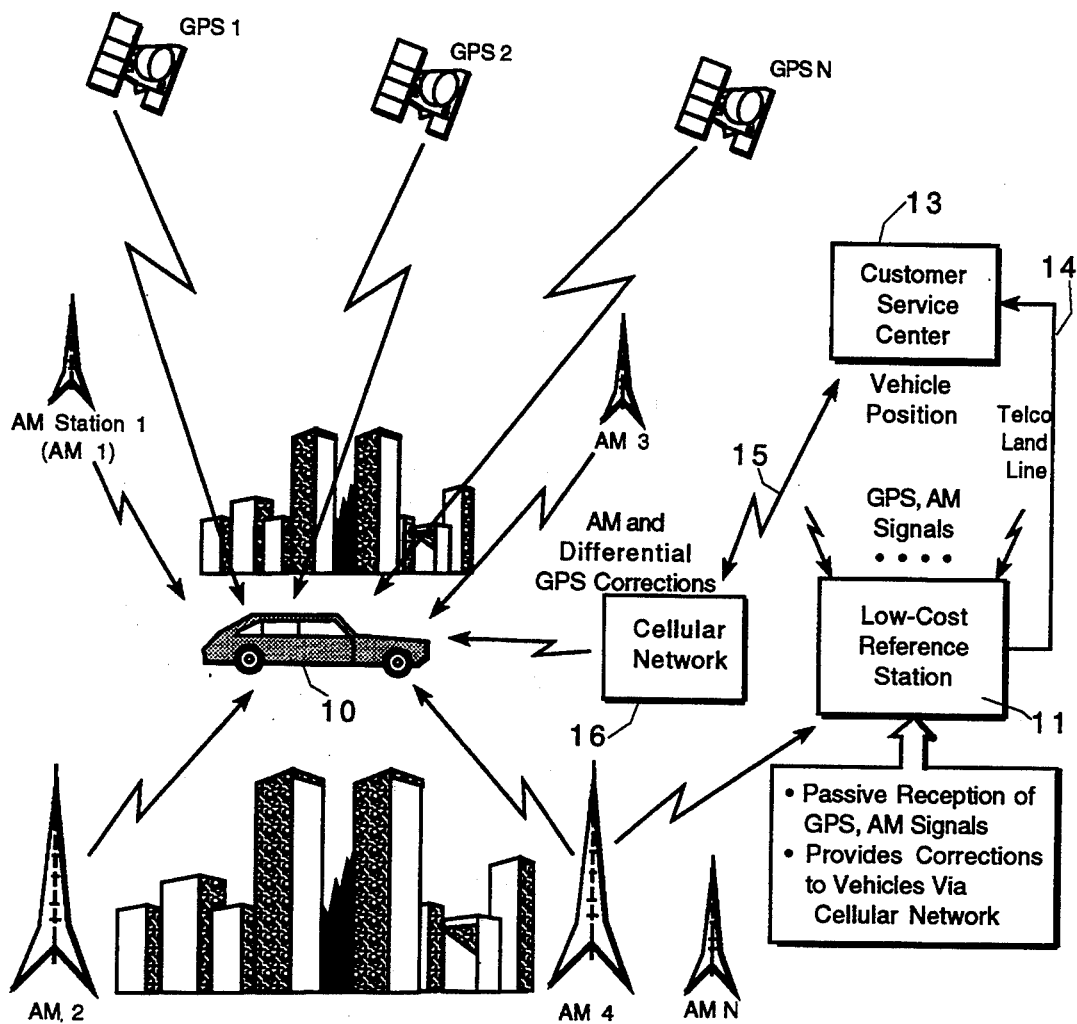
FIG. 1 is a broad schematic representation of the system architecture incorporating the invention.

Referring to the preferred embodiment of FIG. 1, a vehicle 10 is traveling on a roadway in a metropolitan area having a plurality of conventional AM radio stations AM1, AM2, AM3 . . . AMN (500–1600 Kc) and may have in view one or more GPS satellites, GPS1, GPS2 . . . GPSN. Reference station 11 passively receives the broadcast AM and GPS signals without any interaction or coordination with the GPS and AM systems. Each urban canyon of interest has a reference station 11 that measures frequency and wavelength variations and provides these, along with the GPS ephemeris (see application Ser. No. 07/992,892) to the customer service center 13 via land lines 14, preferably provided by the local telephone company. The service center 13 then supply the AM correction data to vehicle 10 via a data link 15 including the cellular telephone network 16.

Figure 2:
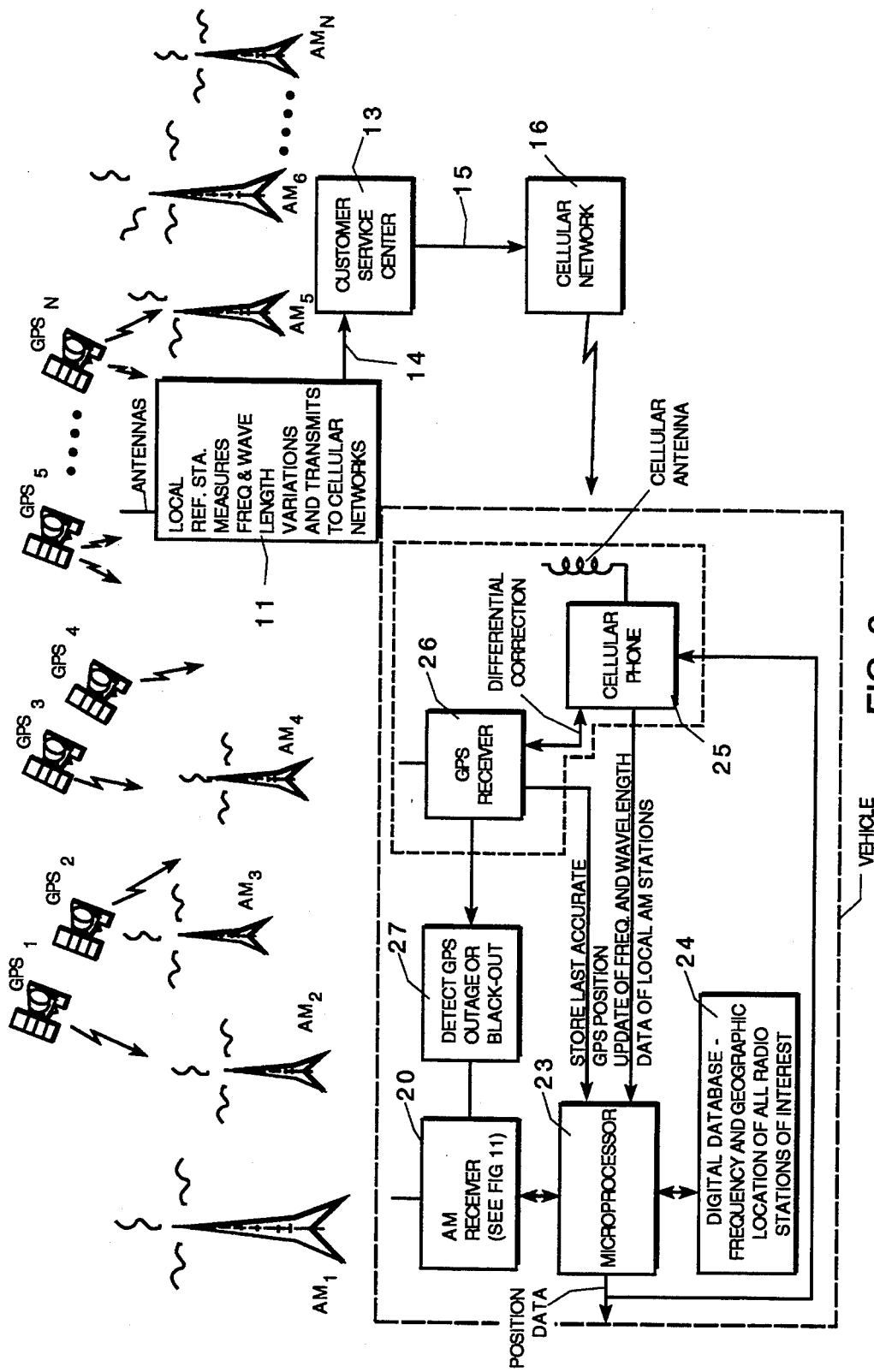
FIG. 2 is a more detailed schematic representation of the invention.

A more detailed schematic block diagram of the vehicle mounted portions of the system is shown in FIG. 2 wherein an AM receiver 20 has antenna 21 for receiving the AM signals broadcast by stations AM1, AM2 . . . AMN and provide the phase measurements which are used to determine position, as described later herein in connection with FIG. 4. AM receiver 20 is coupled to microprocessor 23 and thereby to digital data storage base 24, which has stored therein the frequency and physical location of all of the AM radio stations of interest for the area. Any drift in these AM station's frequencies is corrected by data received from the local reference station 11 via the customer service center 15, cellular network 16, and the cellular telephone 25.

In order to resolve any ambiguities in the AM radio positions, and accommodate the lack of synchronization among the AM stations, the most recent accurate GPS position data from GPS receiver 26 is provided to microprocessor 23 for storage in storage 24.

Outside of urban canyon areas positioning via GPS will almost always suffice. Within urban canyons (e.g., downtown Manhattan) considerable blockage from tall buildings TB can dramatically reduce GPS satellite visibility. Within these same urban canyons, however, a significant number (e.g., 5–10) of strong AM signals will be simultaneously available; furthermore, these signals can be expected to "surround" the vehicle 10, thereby yielding excellent signaling geometries for positioning. Within the framework of FIG. 1, the invention may be described as follows:

1. Outside the urban canyon, GPS 26 provides the vehicle with regular, accurate position updates.
2. The local Reference Station 11 shown regularly receives signals from all local AM stations of interest and measures key parameters (e.g., frequency and wavelength variation), that are provided to customer service centers 15 and then to vehicles via the cellular network and serve as differential corrections. AM signals are passively received—i.e. asynchronously, and with no coordination with the AM Stations. With proper site selection, and utilization of a suitable, low-cost clock reference (e.g., 1 part in $10^{10}$), this Reference Station 11 can be established and maintained very cost-effectively; for example, they do not have to be mounted on an expensive tower. The reference station also collects data from the GPS satellites in order to generate GPS differential data. This data is also provided to the vehicles via the customer service centers.

3. As the vehicle approaches the urban canyon TB, the vehicle receives local AM signals from stations AM1, AM2, AM3 . . . AMN, and associated differential corrections from the Reference Station 11. The vehicle contains a digital database 24 that includes the frequencies and locations of all local AM stations of interest. In this embodiment, AM signals are not used for positioning as long as GPS is providing reliable position.

4. The vehicle 10 continues its positioning process via GPS until a GPS blockage or outage is detected by detector 27. At the onset of a GPS outage, the vehicle's positioning system contains an accurate GPS position estimate that serves as the starting point for the AM positioning process. The accuracy of this initial position estimate is on the order of 100'. Since this is a fraction of an AM wavelength, it can serve as the basis for an unambiguous pseudorange estimate for each AM signal that is being received. The AM wavelength is a critical and highly attractive ingredient of the invention, given its amenability to a priori ambiguity resolution and its subsequent amenability to highly accurate tone ranging (see below).

5. The AM positioning process involves incremental, differential range measurements via tone ranging of the AM carriers. The process, illustrated in FIG. 4, includes the following:

a. At least three, and preferably four or more AM signals ($F_1$, $F_2$, $F_3$ and $F_4$) are simultaneously received split by power splitter 30 and sampled in each AM RF processor 35-1, 35-2, 35-3, and 35-4 at 0.5 second (TBR) intervals. This sampling interval is selected because even at a speed of 100 ft/sec (>60 mph), the incremental distance the vehicle travels is a small fraction of an AM wavelength. This is important to ensure that no AM wavelengths are "skipped" from one sampling interval to the next. Also, while a minimum of three simultaneous AM signals are required, more than three can be used to enhance accuracy and/or ensure that the strongest, highest quality AM signals are being employed.

b. The incremental phase of each AM carrier—relative to the previous measurement—is measured, and corrected for phenomena such as carrier frequency drift via the corrections provided by the Reference Station, via the cellular telephone network.

The measurement process sequence is as follows:
The incremental Phase $= \phi_{12} - \phi_{11}$ (Radians)
$\Rightarrow$ Incremental Range $= \lambda_1[(\phi_{12} - \phi_{11})/2\pi] = \Delta R$
$\Rightarrow$ Estimate of New Range at $t_2$, $R_{12} = R_{11} + \Delta R$
Simultaneous Computations for 3 other AM signals
   Yield New Range Values:
   $R_{22}$, $R_{32}$, $R_{42}$ . . . $R_{N2}$
Differenced Ranges Formed: $R_{22} - R_{12}$; $R_{32} - R_{12}$, . . . $R_{N2} - R_{12}$
   Differencing Eliminates Vehicle's Local Clock Error
Set of Differenced Ranges Processed to Yield Updated Position
Process Repeats Every 0.5 sec (TBR)

This phase measurement process reflects the high-accuracy tone ranging process that is uniquely accommodated by the short wavelength of the AM waveform. In particular, for a representative 1 MHz AM carrier and a corresponding ~1000' wavelength, a phase measurement accuracy on the order 1 degree $-2$ degrees yields a corresponding range accuracy of 3'-6'! An exemplary embodiment of a robust implementation approach for this phase measurement process is described later herein.

c. As indicated above, each incremental phase is normalized and multiplied by its respective wavelength to yield an incremental range value, which is then added to the previous value of total range to yield an updated estimate of total range.

d. The resulting set of at least four range values are used to form a set of at least three corresponding differential range values. This differencing process effectively eliminates the vehicle's clock as an error source in the positioning process.

e. Based on the above, at each 0.5 second interval, the set of differential range values are used to compute a new position estimate.

6. Throughout the above process, the vehicle's GPS receiver continues to operate and to ascertain the quality of the received GPS signals. Once GPS quality is resumed, handover from AM—to—GPS positioning takes place. Furthermore, while the above process addresses AM processing only, the invention contemplates and encompasses hybrid approach of processing both AM and GPS signals simultaneously. This should enhance the urban canyon positioning process, since even in the urban canyon at least one GPS signals should always be available with high probability.

DESCRIPTION OF AM SIGNAL PROCESSING APPROACH

Implementation of the invention depends on a robust, low-complexity approach to measuring the incremental phases of several AM signals simultaneously. In one embodiment, signal processing that accomplishes the above is illustrated in FIG. 4. This processing approach is employed by each vehicle, and also by the Reference Station to accurately measure reference values for transmission to each vehicle. The following is noted:

1. Because of its low frequency, each AM signal may be sampled and A/D converted in A/D converter 40 directly at RF without downconversion. As illustrated, the sampling and phase measurement process employed is "open-loop". This has the distinct advantage of not being susceptible to short-lived channel transients—such as impulsive noise arising during a thunderstorm. Thus, in contrast to a closed-loop process, which may lose lock during such all impulsive transient, the embodiment of FIG. 4 would only yield a phase measurement "glitch" due to the transient, which is easily recognizable, and can be discarded; crucial, however, is that the integrity of the sampling and phase measurement process would be maintained.

2. The sampler 40 has the sampling rate shown—i.e., at (4/5)th of the carrier frequency—and is selected so that successive samples are precisely 450 degrees apart, which are thus effectively in-phase (I) and quadrature (Q) samples of the AM carrier sine wave. As has been discussed earlier, the AM frequencies of interest are resident in the vehicle's digital memory 24, and precise frequency information is available via corrections provided by the Reference Station 11. Also high sampling accuracy—to a small fraction of a Hz—is readily achievable via low-cost, existing digital frequency synthesis technology. In fact, the multi-channel digital processor shown in FIG. 4 is readily amenable to miniaturization in an Application Specific Integrated Circuit (ASIC).

3. The multiplicative sequence 42 shown after the A/D converter 41 appropriately rectifies the negative-going I and Q samples, so that the two-stage accumulator 43 that follows can filter out all other AM signals and yield averaged, SNR-enhanced I and Q samples 44. This sampling and averaging takes place for ~1 ms every 0.5 seconds. For the strong AM signals of interest, this 1 ms interval will be more than adequate for SNR enhancement. Furthermore, the AM carrier phase will vary negligibly due to vehicle motion (e.g., <0.05 degrees) for a 1 MHz AM carrier and a vehicle moving at 100 ft/sec.

4. The averaged I and Q samples, $\bar{I}$ and $\bar{Q}$, are then used as shown to measure phase via the arctangent function 46 or an equivalent. Note that the ratio of $\bar{Q}/\bar{I}$ automatically cancels any AM fluctuations superimposed on the desired sinusoidal waveform.

A summary of mathematical considerations is as follows:

MATHEMATICAL DESCRIPTION
- $a(t)$ Represents AM Information;
- $w$ is AM Carrier Radian Frequency;
  (Reflects Reference Station Corrections);
- $wt_i$ is Odd Multiple of $\pi/2$

- I-Samples: $A[1 + a(t_i)]\cos[wt_i + \phi] \sim A[1 + a(t_i)]\cos\phi$

- Q-Samples: $A[1 + a(t_i + \delta)]\sin[wt_i + \phi] \sim A[1 + a(t_i)]\sin\phi$; $a(t_i + \delta) \sim a(t_i)$ for ~1μs

- $\bar{I} \sim A \sum_i [1 + a(t_i)]\cos\phi$; $\bar{Q} \sim A \sum_i [1 + a(t_i)]\sin\phi$ Note: $\phi$ Varies Negligibly Over Averaging Interval (~1 ms)

$\rightarrow \phi = TAN^{-1}(\bar{Q}/\bar{I})$

SUMMARY

The invention introduces new capabilities, for truly global positioning, that are neither in existence nor currently planned. Unique features of the invention include the following:

1. Global, international positioning capability (~30m, 3σ):
   a. Via GPS or differential GPS outside of urban canyons, where GPS is unobstructed.
   b. Via AM radio signals (or a combination of GPS and AM) within urban canyon areas, where GPS obstruction occurs and local AM signals are strongest.
2. Passive reception of GPS and AM signals:
   a. Each vehicle contains database that stores all relevant AM station locations and frequencies.
   b. No interaction, coordination, synchronization with, GPS or AM stations.
3. A low cost Reference Station 11 is located within each required urban canyon area:
   a. Measures key AM station parameters.
   b. Transmits parameters to vehicles via low rate data link that employs the cellular telephone network.
4. Key operations concept ingredients:
   a. Vehicle uses GPS-derived position data as unambiguous position reference prior to initiation of AM signal processing (accomplished prior to entry into urban canyon).
5. Key features/advantages of AM signal utilization:
   a. The AM signal structure is simple and universal.
   b. GPS a priori position accuracy is a fraction of the AM wavelength.
   c. Even at high-speeds (e.g., 100 ft/sec) a vehicle's incremental position changes by a small fraction of an AM wavelength in-between position updates; this prevents large errors from occurring that may arise from "cycle skips".
   d. The AM waveform includes a residual carrier that easily lends itself to highly accurate tone ranging.
   e. Straightforward tone ranging processing, using sampling and high SNR phase estimation, yields range estimate accuracies on the order of 5'; this is a direct result of the AM wavelength that varies between ~600' and 2000'.
   f. The low AM frequency permits a very simplified receiver/processor, with sampling and A/D conversion directly at the incoming RF, without downconversion required.
   g. Open loop processing and a reasonable update rate yield robustness against impulsive noise (e.g., lightning).
   h. The relatively long AM wavelength yields a degree of robustness against multipath.

While a preferred embodiment of the invention have been shown and described, it will be appreciated that various other embodiments and adaptations of the invention will be readily apparent to those skilled in the art.

What is claimed is:

1. In a GPS system wherein a plurality of satellites transmit time and location data over radio frequency signals to enable a mobile GPS receiver station on the ground to determine its position and produce a GPS position signal, and a cellular telephone carried with said mobile GPS receiver, and
   a plurality of conventional ground based amplitude modulated (AM) transmitters for broadcasting AM signals, the improvement comprising:
   1) each mobile GPS receiver station including phase detection means for simultaneously receiving a predetermined number of said AM signals, and measuring the changes in phase of each of said AM signals as said mobile GPS receiver travels, and deriving therefrom an AM position signal,
   2) a reference station for receiving said GPS and AM signals and providing correction signals and transmitting said correction signals by said cellular telephone to said mobile receiver station, and
   3) means for using said GPS position signal for resolving any ambiguities in said AM radio position signal and to accommodate the lack of synchronization in said AM transmitters.

2. The invention defined in claim 1 wherein said reference station measures the frequency and wavelength variations in said AM signals and conveys same to said mobile station by said cellular telephone.

3. The invention defined in claim 1 including means for detecting outages or blockages in said GPS signal and providing said AM position signal as the position of said mobile GPS receiver.

4. The invention defined in claim 1 including means for storing the frequency and geographic positions of said plurality of AM transmitters and means for selecting therefrom said predetermined number.

5. A position location system operating in combination with a GPS system wherein a plurality of satellites transmit time and location data over radio frequency signals to enable a mobile GPS receiver station on the ground to determine its position, and a cellular telephone carried with said mobile GPS receiver, and wherein there are a plurality of conventional ground based commercial RF broadcast transmitters for transmitting commercial broadcast signals, characterized by:

1) each mobile GPS receiver station including phase detection means for (1) simultaneously receiving a predetermined number of said commercial broadcast signals, and (2) measuring the changes in phase of each of said commercial broadcast signals as said mobile GPS receiver travels, and deriving therefrom a further position signal, and
2) means to detect GPS outage or black-out and providing said further position signal as an indication of position of said mobile GPS receiver station.

6. The position location system defined in claim 5 wherein said commercial RF broadcast signals are amplitude modulated (AM) signals.

7. A location finding navigation system for operating in an environment of GPS satellite signals and commercial radio wave (CR) broadcast signals and wherein from time-to-time said navigation system is in an obstructed GPS signal area, comprising:

first receiver means for receiving a predetermined number of GPS satellite signals and producing a GPS location signal,
second receiver means for receiving a predetermined number of said CR broadcast signals and producing a CR location signal,
means connected to receive said GPS and CR location signal and selecting the most reliable of said location signals and presenting the most reliable location signal to a utilization device.

* * * * *